(12) United States Patent
Ragan et al.

(10) Patent No.: US 10,118,765 B2
(45) Date of Patent: Nov. 6, 2018

(54) FLEXIBLE-BELT CONVEYOR AND METHODS OF CONVEYING

(71) Applicant: Laitram, L.L.C., Harahan, LA (US)

(72) Inventors: Bryant G. Ragan, Metairie, LA (US); John F. Landrum, New Orleans, LA (US); Robert L. Rosen, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/601,312

(22) Filed: May 22, 2017

(65) Prior Publication Data

US 2017/0253432 A1     Sep. 7, 2017

Related U.S. Application Data

(63) Continuation of application No. PCT/US2015/060804, filed on Nov. 16, 2015.

(60) Provisional application No. 62/089,372, filed on Dec. 9, 2014.

(51) Int. Cl.
*B65G 15/60* (2006.01)
*B65G 39/10* (2006.01)
*B65G 39/12* (2006.01)
*B65G 15/64* (2006.01)
*B65G 39/00* (2006.01)

(52) U.S. Cl.
CPC ............. *B65G 15/60* (2013.01); *B65G 39/10* (2013.01); *B65G 39/125* (2013.01); *B65G 15/64* (2013.01); *B65G 39/00* (2013.01)

(58) Field of Classification Search
CPC ....... B65G 15/60; B65G 39/10; B65G 39/125

USPC ......... 198/370.04, 808, 823, 824, 825, 826, 198/830, 834, 837
See application file for complete search history.

(56) References Cited

U.S. PATENT DOCUMENTS

| | | | |
|---|---|---|---|
| 2,815,851 A | 12/1957 | Yoshimura | |
| 3,075,633 A | 1/1963 | Presti | |
| 3,286,811 A * | 11/1966 | McWilliams | ........ B65G 17/067 198/370.04 |
| 4,461,378 A * | 7/1984 | Roth | ...................... B65G 17/02 198/370.04 |
| 4,917,232 A * | 4/1990 | Densmore | .............. B65G 39/16 198/808 |
| 4,932,516 A | 6/1990 | Andersson | |

(Continued)

FOREIGN PATENT DOCUMENTS

| | | |
|---|---|---|
| JP | 2009-126662 A | 6/2009 |
| KR | 10-2012-0072479 A | 7/2012 |
| KR | 10-1220913 B1 | 2/2013 |

OTHER PUBLICATIONS

International Search Report and Written Opinion of the International Searching Authority, PCT/US2015/060804, dated Feb. 24, 2016, Korean Intellectual Property Office, Republic of Korea.

*Primary Examiner* — Douglas A Hess
(74) *Attorney, Agent, or Firm* — James T. Cronvich

(57) ABSTRACT

A trough-belt conveyor with adjustable bearing support wings and methods for operating the conveyor to sort or destack articles. The conveyor includes a flexible conveyor belt supported in a series of support beds. Adjustable support beds have a base bearing member flanked by a pair of bearing wings. One or both of the wings are adjustable to raise or lower the sides of the belt above and below the plane of the center of the belt supported atop the base member.

13 Claims, 3 Drawing Sheets

(56) References Cited

U.S. PATENT DOCUMENTS

| | | | | |
|---|---|---|---|---|
| 5,341,920 A * | 8/1994 | Riffe | | B65G 39/12 198/825 |
| 5,341,921 A | 8/1994 | Kokolis | | |
| 5,373,935 A * | 12/1994 | Anderson | | B65G 39/12 198/808 |
| 5,388,681 A * | 2/1995 | Bonnet | | B65G 15/30 198/477.1 |
| 6,126,383 A | 10/2000 | Franklin et al. | | |
| 6,390,287 B2 | 5/2002 | Riffe | | |
| 6,460,681 B1 | 10/2002 | Coutant et al. | | |
| 6,634,490 B2 | 10/2003 | Fischer et al. | | |
| 6,695,131 B2 | 2/2004 | Swinderman | | |
| 6,811,023 B1 * | 11/2004 | Christiana | | B65G 17/10 198/818 |
| 6,827,198 B1 * | 12/2004 | Costanzo | | B65G 47/945 198/370.04 |
| 6,971,507 B2 * | 12/2005 | Forman | | B65G 15/60 198/805 |
| 7,497,325 B2 * | 3/2009 | Simoens | | B65G 15/62 198/823 |
| 7,527,144 B2 | 5/2009 | Ostman | | |
| 7,614,494 B2 * | 11/2009 | Hinson | | B65G 39/125 198/818 |
| 7,686,157 B2 * | 3/2010 | Murayama | | B65G 39/16 198/806 |
| 7,837,030 B2 | 11/2010 | Daly et al. | | |
| 7,971,877 B2 * | 7/2011 | Grob | | B65H 29/62 198/360 |
| 9,027,744 B1 | 5/2015 | Balcar | | |
| 9,033,135 B1 | 5/2015 | Sharp | | |
| 9,856,088 B1 * | 1/2018 | Riggs | | B65G 15/08 |
| 9,878,852 B2 * | 1/2018 | Sorensen | | B65G 43/08 |
| 2013/0161157 A1 | 6/2013 | Schmidt | | |
| 2013/0284565 A1 | 10/2013 | Kuiper et al. | | |
| 2014/0083822 A1 | 3/2014 | Swinderman et al. | | |
| 2015/0053535 A1 | 2/2015 | Silva | | |

* cited by examiner

FLEXIBLE-BELT CONVEYOR AND METHODS OF CONVEYING

CROSS-REFERENCE TO RELATED APPLICATIONS

This application is a continuation of International Patent Application No. PCT/US2015/060804, "Flexible-Belt Conveyor and Methods of Conveying," with international filing date Nov. 16, 2015, which claims the benefit of U.S. Provisional Patent Application No. 62/089,372, filed Dec. 9, 2014. Both of those applications are incorporated into this application by reference.

BACKGROUND

The invention relates generally to power-driven conveyors. More particularly, it relates to flexible-belt conveyors with adjustable carryway supports.

In mail-handling systems and other applications involving the processing of articles individually, stacked articles cause problems. Before articles can be properly processed, they must first be unstacked.

SUMMARY

One version of a conveyor embodying features of the invention comprises a flexible conveyor belt and a plurality of support beds spaced apart in a conveying direction along a carryway run to support the belt. At least one of the support beds includes a first bearing segment in contact with a first portion of the flexible conveyor belt and a second bearing segment in contact with a second portion. The first bearing segment forms an angle with the second bearing segment viewed in the conveying direction. An actuator coupled to at least one of the first and second bearing segments adjusts the angle.

Another version of a conveyor comprises spaced apart support beds supporting a flexible conveyor belt along a carryway run. Each of the support beds includes a base bearing member extending laterally across the carryway run from a first end to a second end, a first bearing wing flanking the base bearing member at the first end of the base bearing member, and a second bearing wing flanking the base bearing member at the second end of the base bearing member. The base member defines a base axis. The first bearing wing has an axis defining a first wing angle with the base axis, and the second bearing wing has an axis defining a second wing angle with the base axis to define a support-bed geometry. The flexible conveyor belt is supported atop the base bearing member and the first and second bearing wings and conforms to the support-bed geometry. A first actuator coupled to the first bearing wing adjusts the first wing angle.

Still another version of a conveyor comprises a flexible conveyor belt having first and second sides and spaced apart support beds supporting the flexible conveyor belt along a carryway run. At least one of the support beds includes a base bearing member extending laterally across the carryway run from a first end to a second end and defining a base axis, a first bearing wing flanking the base bearing member at the first end of the base bearing member and supporting the first side of the flexible conveyor belt and having an axis declining downward away from the base axis. The flexible conveyor belt bends downward atop the first bearing wing.

In another aspect one version of an adjustable support bed embodying features of the invention for supporting a flexible conveyor belt comprises a first and second bearing segments each having a bearing surface. The bearing surface of the first bearing segment forms an angle with the bearing surface of the second bearing segment. An actuator coupled to at least one of the first and second bearing segments adjusts the angle.

Another version of an adjustable support bed for supporting a flexible conveyor belt comprises a base bearing member extending from a first end to a second end and defining a base axis, a first bearing wing flanking the base bearing member at the first end of the base bearing member, and a second bearing wing flanking the base bearing member at the second end of the base bearing member. The first bearing wing has an axis defining a first wing angle with the base axis, and the second bearing wing has an axis defining a second wing angle with the base axis to define a support-bed geometry. A flexible conveyor belt is supportable atop the base bearing member and the first and second bearing wings in conformation with the roller-bed geometry. A first actuator coupled to the first bearing wing adjusts the first wing angle.

In another aspect a method for destacking articles comprises: (a) loading a mass of articles on a flexible conveyor belt; (b) advancing the flexible conveyor belt downstream atop a series of support beds; (c) adjusting one or more of the support beds into a U shape to bend both sides of the flexible conveyor belt upward to toss articles away from the sides of the flexible conveyor belt; and (d) adjusting one or more of the support beds downstream to allow the flexible conveyor belt to flatten and unstack the tossed articles.

In yet another aspect a method for transferring articles off the side of a conveyor belt comprises: (a) transporting articles on a flexible conveyor belt having first and second sides advancing atop a series of support beds that each include a base bearing member flanked by a first bearing wing supporting the first side of the flexible conveyor belt; and (b) lowering the first bearing wing to a position angled downward away from the base bearing member so that the first side of the flexible conveyor belt is tilted downward by the weight of the articles between the base bearing member and the first bearing wing to allow them to slide off the first side of the flexible conveyor belt.

DETAILED DESCRIPTION

Figure 1:
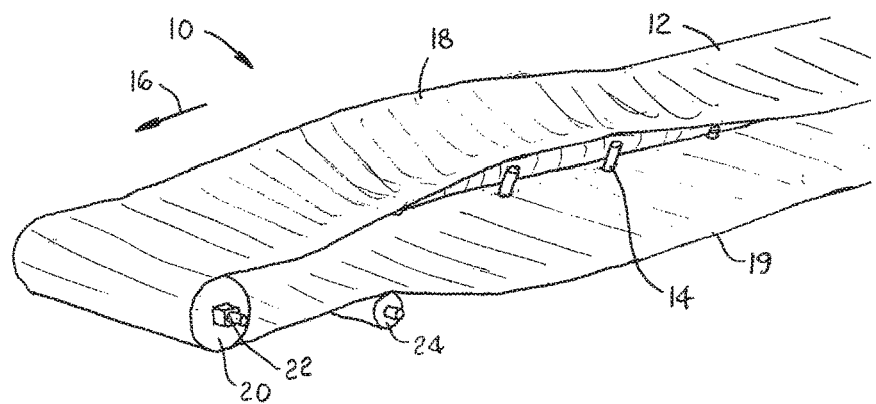
FIG. 1 is a perspective view of a portion of one version of a belt conveyor embodying features of the invention.

A portion of a conveyor embodying features of the invention is shown in FIG. 1. The conveyor 10 comprises a flexible conveyor belt 12 supported on a series of support beds 14 spaced apart in a conveying direction 16 on an upper run 18. At the end of the upper carryway run 18, the conveyor belt 12 reverses around drive sprockets or a pulley 20 mounted on a shaft 22 and returns via a lower run 19. A snub roller 24 decreases sag in the lower run 19 and increases belt wrap around the pulley 20. The conveyor belt may be a pre-tensioned, pulley-driven flat belt, a toothed, positively driven belt, or any belt flexible enough to bend about axes parallel to the conveying direction 16 to form a trough.

Figure 2A:
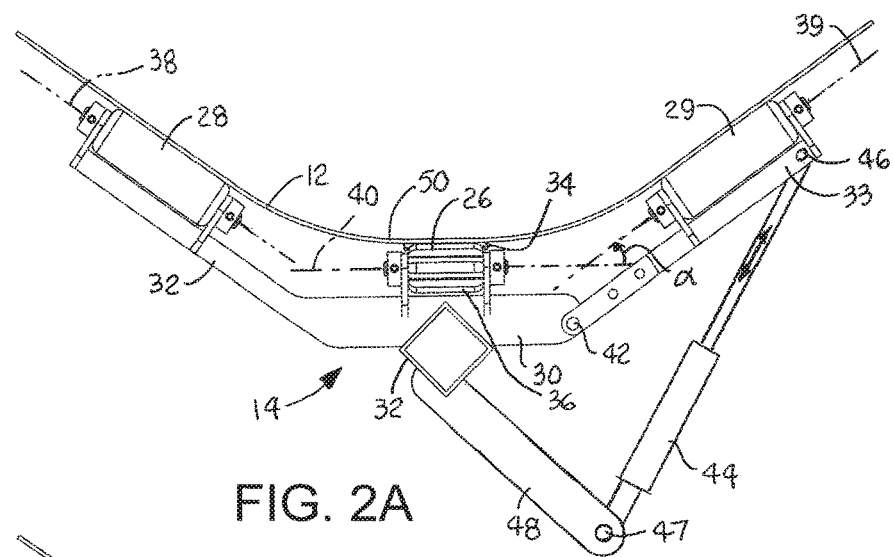
FIGS. 2A and 2B are front elevation views of support beds usable in a conveyor as in FIG. 1 in raised and lowered positions.
Figure 2B:
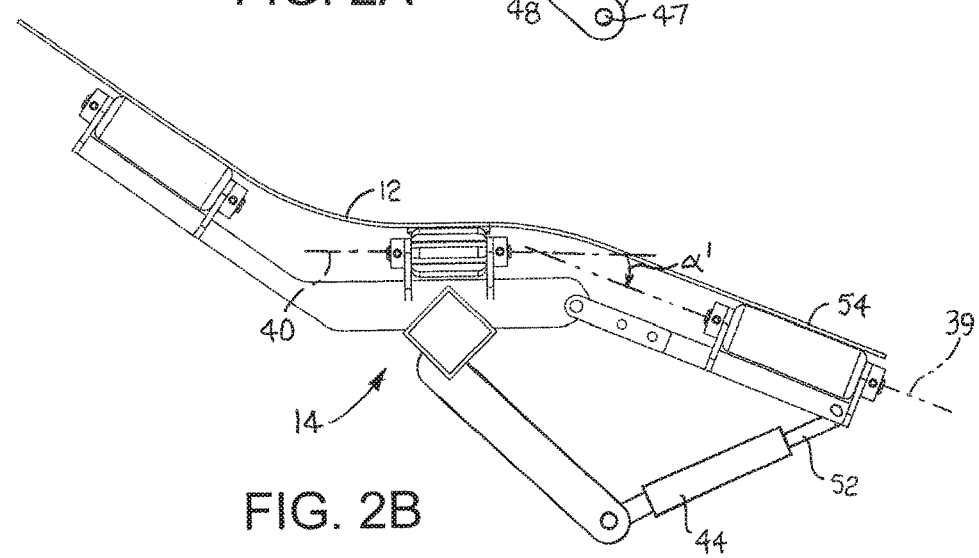

As shown in FIGS. 2A and 2B, one version of a support bed 14 comprises a base bearing member 26 flanked by left and right bearing wings 28, 29. The base member 26 and the wings 28, 29 are supported on a support 30 mounted on a conveyor frame 32. The support 30 has two arms 32, 33 on which the wings 28, 29 are attached. In this example, the base member 26 and the wings 28, 29 are rollers for low-friction rolling contact with the bottom of the conveyor belt 12. But the wings 28, 29 or the base member 26 could be static bearing surfaces, such as shoes, rather than rollers, for use with many belts. The belt 12 shown in FIGS. 2A and 2B has central drive teeth 34 regularly spaced apart along its length. The base roller 26 has peripheral drive members 36 that engage the belt's teeth 34. The base rollers 26 may be passive, or one or more of them may be motor-driven to serve as an intermediate drive for the conveyor belt 12. Likewise, the wing rollers 28, 29 may be passive or driven with or without drive members to engage the belt positively or frictionally.

The support bed 14 is shown in FIGS. 2A and 2B with a fixed arm 32 and an adjustable arm 33. But both arms could be made adjustable. Or the support bed could have a single arm. The fixed arm 32 maintains the axis 38 of the left wing 28 at a fixed angle relative to the base member's axis 40, which is typically horizontal. The adjustable arm 33 rotates about a pivot 42 on the support 30. An actuator 44, such as a linear actuator, pivotally connected to the adjustable arm 33 at a pivot 46 and to a support arm 48 at another pivot 47, is used to adjust the angle a between the base axis 40 and the axis 39 of the right wing 29. (When used in reference to a bearing roller, the term axis means the axis of rotation of the roller. When used in reference to a shoe or other static bearing, the term axis means a line parallel to the bearing surface contacting the belt and perpendicular to the conveying direction.) Examples of actuators include automated pneumatic, hydraulic, electromechanical, or magnetic actuators. A controller, not shown, controls the actuators. The left arm could similarly be made pivotable and adjustable by another actuator similarly attached. In FIG. 2A the actuator 44 is shown with its length-adjustable rod 52 extended, raising the right wing 29 up to the same angle as the fixed wing 28. In this case the angle a is a positive angle measured counterclockwise from the base axis 40. The raised wings 28, 29 form a U shape that causes the flexible conveyor belt 12 to form a trough that helps confine articles on the belt's outer conveying surface 50. The base member 26 forms a first bearing segment in contact with a middle portion of the conveyor belt 12, while the wings 28, 29 form second and third bearing segments in contact with flanking, outer side portions of the belt. Each segment could include one or more individual bearing members. In FIG. 2B the actuator 44 is shown with its length-adjustable rod 52 retracted, allowing the right side 54 of the belt 12 to bend below the base axis 40. In this case the angle $\alpha'$ between the base axis 40 and the right wing's axis 39 is negative. So the right side 54 of the belt 12 can be raised and lowered above and below the plane of the center of the belt supported atop the base member 26. Articles atop the lowered right half of the belt 12 are allowed to fall, by gravity, off the right side 54 of the belt. In this way the adjustable support beds 14 can be used to sort articles off the side of the belt 12 at different locations along the length of the conveyor.

Figure 3:
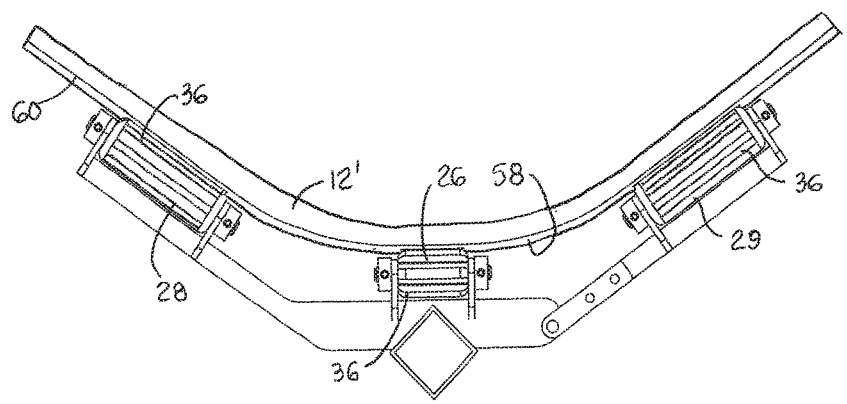
FIG. 3 is a front elevation view of another version of a support bed for a troughed conveyor belt in a conveyor as in FIG. 1.

FIG. 3 shows a belt 12' having regularly spaced drive bars 58, or elongated teeth, extending across the width of the underside 60 of the belt. With this belt 12' the base roller 26 and the two wing rollers 28, 29 all include drive members 36 to engage the belt's drive bar 58.

The rollers can be idle rollers or can be driven to provide an intermediate drive that assists the main drive pulley or sprockets. The drive bars 58 may be segmented with gaps in the vicinity of the bends in the belt to facilitate bending.

Figure 4A:
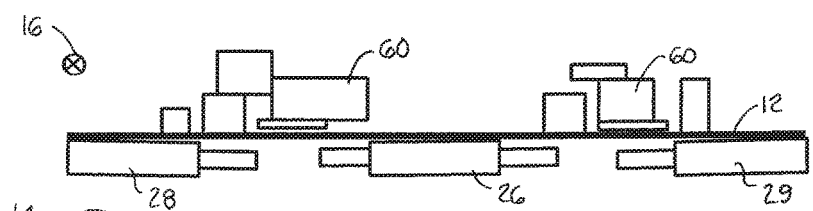
FIGS. 4A-4C are sequential schematics illustrating destacking of articles with a conveyor as in FIG. 1.
Figure 4B:
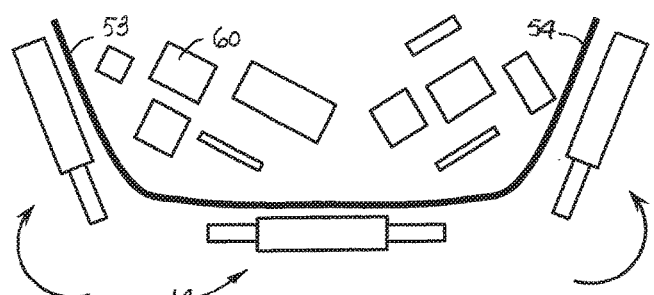
Figure 4C:
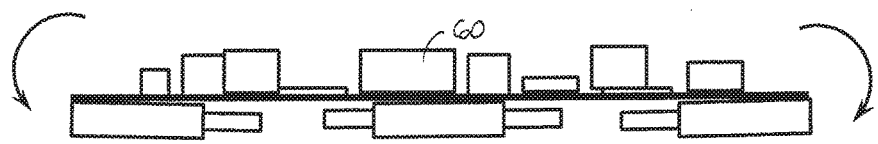

A flexible belt as in FIGS. 2A-2B and FIG. 3 may be used as in FIGS. 4A-4C to destack a mass of stacked conveyed articles 60 loaded on the belt. As shown in FIG. 4A, the conveyor belt 12 is shown running flat in the conveying direction 16 into the page. Both wings 28, 29 of the support bed 14 are lowered, in line at an angle of 0° with respect to the base member 26. In FIG. 4B an adjustable support bed 14 downstream is shown with the two wings 28, 29 in a raised position causing the conveyor belt to trough. The rising sides 53, 54 of the belt toss the articles 60 away from the sides to help separate the articles so that when the belt 12 is allowed to flatten again farther downstream by lowering the wings 28, 29 as in FIG. 4C, the articles 60 are easily destacked. The rapid and repeated lowering and raising of the wings along the length of the upper carryway helps destack articles. Besides destacking articles such as parcels, the conveyor can also be used to distribute articles on the belt or to distribute additives more uniformly on conveyed products—for example, distributing salt uniformly on snack foods.

Figure 5A:
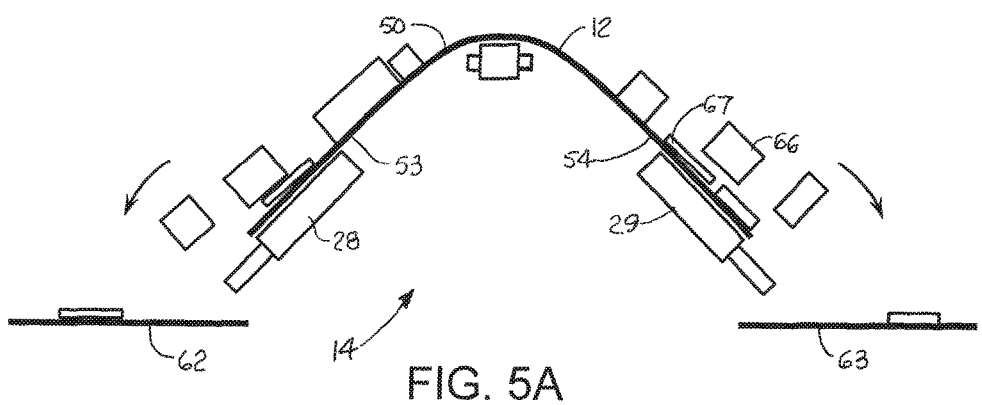
FIGS. 5A and 5B are front elevation and top plan schematics of a conveyor as in FIG. 1 illustrating recirculation of destacked articles.
Figure 5B:
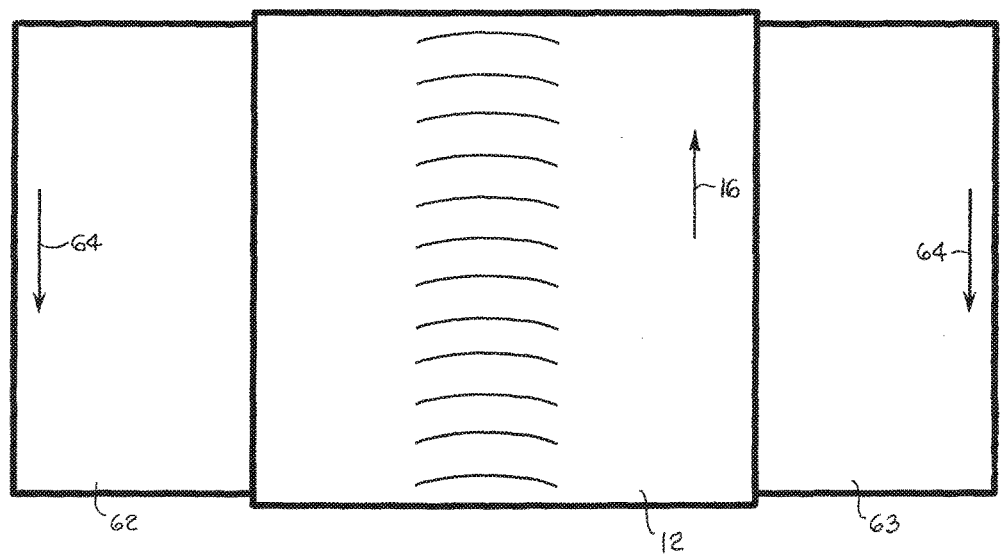

Another use of the flexible conveyor belt 12 with adjustable bearing wings 28, 29 is shown in FIGS. 5A and 5B. The destacking conveyor belt advances in the conveying direction 16 atop the support beds 14. The destacking belt 12 runs slightly above a pair of flanking recirculation conveyors 62, 63 advancing articles in the opposite direction 64. The two wings on the destacking belt 12 are lowered at a negative angle. Articles 66 piggy-backed atop other articles 67 slide along the underneath articles down the lowered sides 53, 54 of the inverted-U belt 12 and onto the recirculation conveyors 62, 63. Greater friction between the articles and the conveying surface 50 of the belt 12 prevents the articles 67 directly contacting the belt from sliding off onto the recirculation conveyors 63, 64. After the piggy-backed articles 66 are removed, the belt 12 flattens out as it encounters the flattened support beds downstream. The flattened belt 12 conveys the remaining destacked articles to further downstream processing. Besides being used for destacking, the conveyor can be used as a reject conveyor with the conveyor belt 12 dropping rejected articles over the side onto the flanking conveyors 62, 63.

Although the invention has been described with respect to a few exemplary versions, other versions are possible. For example, the flexible conveyor belt may be realized as a modular plastic conveyor belt with rows of stiff modules connected by flexible hinge rods extending laterally across a continuous seam running along the length of the belt between laterally adjacent modules. Such a belt is defined as a flexible conveyor belt in this application because of the belt's ability to change its shape to conform to the geometry of adjustable conveyor beds. So any conveyor belt having the ability to conform to the changing geometry provided by adjustable support beds in the carryway is defined as a flexible conveyor belt. As another example, the support beds could have more than three bearing segments to form geometries other than those shown in the examples.

What is claimed is:

1. A conveyor comprising:
    a flexible conveyor belt;
    a plurality of support beds spaced apart in a conveying direction along a carryway run to support the flexible conveyor belt;
    wherein at least one of the support beds includes:
        a first bearing segment in contact with a first portion of the flexible conveyor belt;
        a second bearing segment in contact with a second portion of the flexible conveyor belt;
        wherein the first bearing segment forms an angle with the second bearing segment viewed in the conveying direction;
        an actuator coupled to at least one of the first and second bearing segments to adjust the angle;
        wherein the angle is adjustable over a range of angles that includes negative angles at which the second bearing segment is angled downward from the first bearing segment.

2. A conveyor as in claim 1 wherein the first bearing segment supports the first portion of the flexible conveyor belt in a horizontal plane.

3. A conveyor as in claim 1 wherein the at least one of the support beds further includes a third bearing segment in contact with a third portion of the flexible conveyor belt on the opposite side of the first bearing segment from the second bearing segment.

4. A conveyor as in claim 1 wherein the first and second bearing segments include rollers in contact with the flexible conveyor belt.

5. An adjustable support bed for a flexible conveyor belt, comprising:
    a first bearing segment having a bearing surface;
    a second bearing segment having a bearing surface;
    wherein the bearing surface of the first bearing segment forms an angle with the bearing surface of the second bearing segment;
    an actuator coupled to at least one of the first and second bearing segments to adjust the angle;
        wherein the angle is adjustable over a range of angles that includes negative angles at which the second bearing segment is angled downward from the first bearing segment.

6. An adjustable support bed as in claim 5 further including a third bearing segment having a bearing surface on the opposite side of the first bearing segment from the second bearing segment.

7. An adjustable support bed as in claim 5 wherein the first and second bearing segments include rollers forming the bearing surfaces.

8. A conveyor comprising:
    a flexible conveyor belt;
    a plurality of spaced apart support beds supporting the flexible conveyor belt along a carryway run;
    wherein each of the support beds includes:
        a base bearing member extending laterally across the carryway run from a first end to a second end and defining a base axis;
        a first bearing wing flanking the base bearing member at the first end of the base bearing member;
        a second bearing wing flanking the base bearing member at the second end of the base bearing member;
        wherein the first bearing wing has an axis defining a first wing angle with the base axis and the second bearing wing has an axis defining a second wing angle with the base axis to define a support-bed geometry;
        wherein the flexible conveyor belt is supported atop the base bearing member and the first and second bearing wings and conforms to the support-bed geometry;
        a first actuator coupled to the first bearing wing to adjust the first wing angle;
        wherein the first wing angle is adjustable over a range of angles from a positive first wing angle at which the first bearing wing is angled upward away from the base bearing member to a negative first wing angle at which the first bearing wing is angled downward away from the base bearing member.

9. A conveyor as in claim 8 wherein one or more of the base bearing member, the first bearing wing, and second bearing wings are rollers.

10. A conveyor as in claim 8 wherein the conveyor belt includes an underside having spaced apart drive teeth and wherein one or more of the base bearing members, the first bearing wings, or the second bearing wings are rollers powered to rotate and include peripheral drive members engaging the drive teeth to drive the flexible conveyor belt.

11. A conveyor as in claim 8 further comprising a second actuator coupled to the second bearing wing to adjust the second wing angle.

12. A method for transferring articles off the side of a conveyor belt, comprising:
    (a) transporting articles on a flexible conveyor belt having first and second sides advancing atop a series of support beds that each include a base bearing member flanked by a first bearing wing supporting the first side of the flexible conveyor belt;
    (b) lowering the first bearing wing to a position angled downward away from the base bearing member so that the first side of the flexible conveyor belt is tilted downward by the weight of the articles between the base bearing member and the first bearing wing to allow them to slide off the first side of the flexible conveyor belt.

13. The method of claim 12 further comprising lowering a second bearing wing supporting the second side of the conveyor belt to a position angled downward away from the base bearing member so that the second side of the flexible conveyor belt is tilted downward by the weight of the articles between the base bearing member and the second bearing wing to allow them to slide off the second side of the flexible conveyor belt.

* * * * *